R. A. FESSENDEN.
METHOD AND APPARATUS FOR DETECTING LOW FREQUENCY IMPULSES.
APPLICATION FILED MAY 21, 1917.
1,348,825. Patented Aug. 3, 1920.
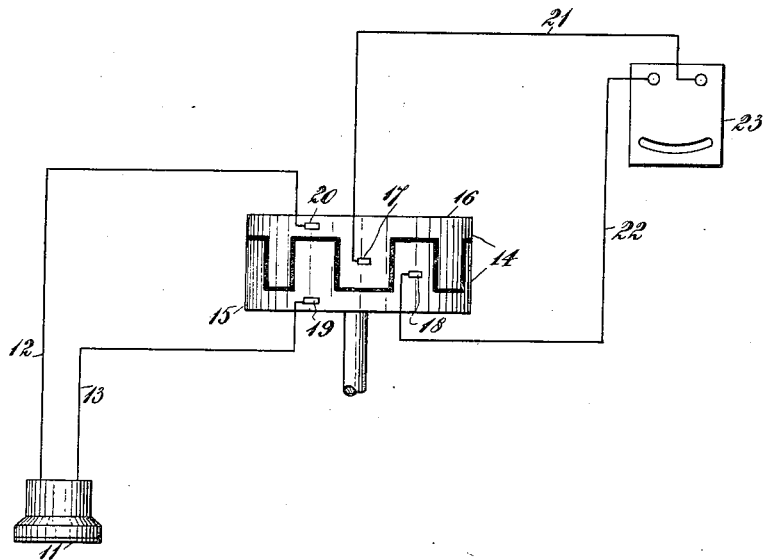
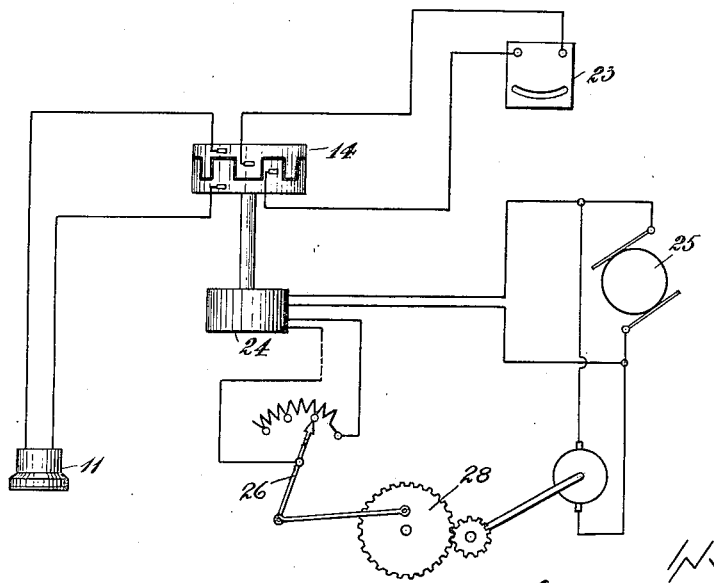

UNITED STATES PATENT OFFICE.

REGINALD A. FESSENDEN, OF BROOKLINE, MASSACHUSETTS, ASSIGNOR TO SUBMARINE SIGNAL COMPANY, OF PORTLAND, MAINE, A CORPORATION OF MAINE.

METHOD AND APPARATUS FOR DETECTING LOW-FREQUENCY IMPULSES.

1,348,825.  Specification of Letters Patent.  Patented Aug. 3, 1920.

Application filed May 21, 1917. Serial No. 169,830.

*To all whom it may concern:*

Be it known that I, REGINALD A. FESSENDEN, of Brookline, in the county of Norfolk and State of Massachusetts, a citizen of the United States, have invented a new and useful Improvement in Methods and Apparatus for Detecting Low-Frequency Impulses, of which the following is a specification:—

My invention relates to the detection and utilization of low frequency impulses and more particularly low frequency electrical impulses and still more particularly to detecting submarines.

Its object is to obtain increased efficiency for such purposes.

In the acompanying drawings, Figures 1 and 2 show, partly diagrammatically, apparatus suitable for carrying out my invention, Fig. 1 being an enlarged view of a portion of the apparatus which is shown entire in Fig. 2.

Here 11 is a suitable detecting instrument, such as the oscillator described in United States Patent No. 1,163,366, or a microphone and battery. 12 and 13 are its leads. 14 is a commutator of the well-known type, as shown, and commonly used for rectifying alternating currents or for transforming continuous currents into alternating currents. 15 and 16 are the toothed elements of the commutator, separated by insulation as shown. 19 and 20 are brushes connected to the leads 12 and 13 of the oscillator 11, the brush 19 always engaging the element 15 of the commutator and the brush 20 the element 16 of the commutator. 17 and 18 are brushes connected to the leads 21 and 22 of the Weston microammeter 23. Because of the toothed character of the commutator and the arrangement of the brushes with relation thereto, each brush 17 and 18 engages first one element 15, 16 of the commutator and then the other, as will be seen from the drawing. Other known forms of commutators may be substituted for that shown.

The oscillator being placed in the water, when a submarine or other source of low frequency impulses approaches, low frequency electrical impulses are generated by the oscillator 11 and carried to the commutator 14 by the leads 12 and 13.

I have found that these impulses are of such character that if the commutator be driven, as shown in Fig. 2, by a slow speed motor 24 (power for which is furnished by the dynamo 25 and the speed of which can be regulated by the field rheostat 26), on turning the rheostat 26 slowly so as to vary the speed of the motor from its lowest range of say one turn in ten seconds up to its maximum speed, which may be 15 or 20 turns a second, at some one speed the revolution of the commutator will be such as to commutate the low frequency impulses generated by the submarine and give a rectified and easily readable indication on the microammeter 23 or other indicator.

In this way the presence of the submarine may be detected.

The rheostat 26 may be continuously moved between its maximum and minimum positions at a fairly slow rate, either automatically or by hand, and the presence of the submarine and the frequency of the impulses emitted by it noted by determining the speed at which the microammeter 23 gives its steady reading. Other motors having controllable speed may be substituted for the motor 24, but the arrangement shown is believed to be the best for the purpose.

Means for automatically moving the rheostat is shown in Fig. 2 where the hand of the rheostat is connected by a link 27 to a crank pin on a gear 28 which is connected to a motor 29 by a gear and shaft connection, the motor being in circuit with the dynamo 25.

What I claim as my invention is:—

1. The method of detecting electrical impulses whose frequency may lie between certain limits which consists in passing such electrical impulses through a commutating device and varying the comutator frequency of such commutating device gradually from one limit to the other and observing the indication of a continuous current indicator operated by the commutated current from said commutating device.

2. The method of detecting electrical impulses which consists in passing said electrical impulses through a commutating device, periodically varying the commutating frequency of said commutating device and observing the indications of a continuous current indicator operated by the commutated current from said commutating device.

3. The method of detecting low frequency compressional impulses which consists in transforming them into low frequency electrical impulses, rectifying them automatically and periodically at varying rates of rectification and observing the rectified impulses on a continuous current indicator.

4. As a means for detecting low frequency compressional impulses, a receiving instrument responsive to such impulses and capable of transforming them into electrical impulses, a direct current indicator and rectifying means located between said receiving instrument and said indicator and electrically connected to each, whereby said electrical impulses are converted into a direct current to act upon said indicator, and means for automatically and periodically varying said rectifying means.

5. As a means for detecting low frequency compressional impulses, a receiving instrument responsive to such impulses and capable of transforming them into electrical impulses, a direct current indicator and rectifying means located between said receiving instrument and said indicator and electrically connected to each, whereby said electrical impulses are converted into a constant direct current to act upon said indicator, and means for varying the rate of rectification.

6. As a means for detecting low frequency compressional impulses, a receiving instrument responsive to such impulses and capable of transforming them into electrical impulses, a direct current indicator and means located between said receiving instrument and said indicator and electrically connected to each, whereby said electrical impulses are converted into a direct current to act upon said indicator, said means comprising a commutator having two members insulated from each other, each member being constantly connected to said receiver and alternately connected to each terminal of said indicator.

7. In a submarine signaling system, as a means for detecting low frequency compressional impulses, a receiving instrument responsive to such impulses and capable of transforming them into electrical impulses, a direct current indicator and means located between said receiving instrument and said indicator and electrically connected to each, whereby said electrical impulses are converted into a direct current to act upon said indicator, said means comprising a commutator having two members insulated from each other, each member being constantly connected to said receiver and alternately connected to each terminal of said indicator.

REGINALD A. FESSENDEN.